(12) United States Patent
Kennedy, III

(10) Patent No.: US 9,044,646 B2
(45) Date of Patent: Jun. 2, 2015

(54) PROCESS FOR MAKING THERMOPLASTIC GOLF BALL MATERIAL AND GOLF BALL WITH THERMOPLASTIC MATERIAL

(71) Applicant: NIKE, Inc., Beaverton, OR (US)

(72) Inventor: Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 131 days.

(21) Appl. No.: 13/835,112

(22) Filed: Mar. 15, 2013

(65) Prior Publication Data

US 2014/0274469 A1    Sep. 18, 2014

(51) Int. Cl.
| | |
|---|---|
| *A63B 37/00* | (2006.01) |
| *A63B 37/12* | (2006.01) |
| *C08L 23/08* | (2006.01) |
| *C08K 5/09* | (2006.01) |

(52) U.S. Cl.
CPC .......... *A63B 37/007* (2013.01); *A63B 37/0023* (2013.01); *A63B 37/0059* (2013.01); *C08L 23/0869* (2013.01); *C08L 23/0876* (2013.01); *C08L 23/0815* (2013.01); *C08K 5/09* (2013.01)

(58) Field of Classification Search
None
See application file for complete search history.

(56) References Cited

U.S. PATENT DOCUMENTS

| | | | |
|---|---|---|---|
| 7,156,755 B2 | 1/2007 | Kennedy, III et al. | |
| 7,612,135 B2 | 11/2009 | Kennedy, III et al. | |
| 8,106,125 B2 | 1/2012 | Egashira et al. | |
| 2006/0189733 A1* | 8/2006 | Kennedy et al. | 524/322 |
| 2008/0026873 A1* | 1/2008 | Manami et al. | 473/373 |
| 2009/0247323 A1* | 10/2009 | Rajagopalan et al. | 473/373 |

OTHER PUBLICATIONS

International Search Report and Written Opinion for PCT/US2014/015280 dated Dec. 2, 2014.

* cited by examiner

*Primary Examiner* — David Buttner
(74) *Attorney, Agent, or Firm* — Honigman Miller Schwartz and Cohn LLP; Anna M. Budde; Jonathan P. O'Brien

(57) ABSTRACT

A thermoplastic golf ball material is made by combining and reacting (a) an unneutralized copolymer of ethylene and at least one of acrylic acid and methacrylic acid, which has from about 5 to about 12 percent by weight acid monomer; (b) a metallocene-catalyzed copolymer of ethylene and octene; (c) an unsaturated fatty acid; and (d) a metal cation in an amount sufficient to neutralize from about 65 to about 90% of the acid groups, to produce an ionomeric thermoplastic material. The ionomeric thermoplastic material may be used in a core, a cover, or a layer between a core and a cover of a golf ball.

12 Claims, 1 Drawing Sheet

PROCESS FOR MAKING THERMOPLASTIC GOLF BALL MATERIAL AND GOLF BALL WITH THERMOPLASTIC MATERIAL

FIELD OF THE INVENTION

The invention concerns methods for making thermoplastic materials and golf balls containing thermoplastic materials.

BACKGROUND

This section provides information helpful in understanding the invention but that is not necessarily prior art.

Ionomeric resins or ionomers have found use in golf balls. Ionomers are generally ionic copolymers of an olefin (such as ethylene) and a metal of an ethylenically unsaturated carboxylic acid (such as acrylic acid, methacrylic acid, or maleic acid). Metal cations such as sodium or zinc are used to neutralize some portion of the acidic groups in the copolymer resulting in a thermoplastic elastomer exhibiting enhanced properties such as durability for golf ball covers. Available soft ionomer materials, though not as durable or quite as soft as polyurethanes, still have the capability of generating high spin and soft feel.

Ionomers have also found use as a material for cores or other layers between a core and cover (e.g., an outer core layer or mantle layer) of golf balls. Higher hardness ionomers are utilized underneath a soft cover as a mantle layer of the golf ball. The soft-over-hard construction allows for spin separation from the driver to the wedge, or low spin off the driver and high spin off the wedge. In other words, the hard ionomer mantle allows for lower spin off the tee using a driver where a larger portion of the ball is compressed when hit. On higher-angled clubs, such as wedges, the golf ball is not compressed as much as off the tee, and the softer outer cover results in high spin for shots into the green. Modified ionomers with a high degree of neutralization maybe used as parts of the core or inner layers of the golf ball due to their high resilience. Golf balls in which the core or other inner layers are made from materials with high coefficients of restitution (elasticity) generally provide longer distance. Most professional golfers and good amateur golfers desire a golf ball that provides distance when hit off a driver, control and stopping ability on full iron shots as well as high spin on short "touch and feel" shots.

SUMMARY OF THE DISCLOSURE

This section provides a general summary of the disclosure and may not be comprehensive of its full scope or all of the disclosed features.

Disclosed is a method of making an ionomeric thermoplastic golf ball material in which components including (a) an unneutralized (non-ionomeric) copolymer of ethylene and at least one of acrylic acid and methacrylic acid, which has from about 5 to about 14 percent by weight of the acid monomer; (b) a metallocene-catalyzed copolymer of ethylene and octene; (c) an unsaturated fatty acid; and (d) a metal cation in an amount sufficient to neutralize from about 65 to about 90% of the acid groups in the combination are combined and reacted to produce a thermoplastic, 65 to 90% neutralized ionomer material.

In various embodiments, the combination is mixed and reacted at about 150° C. to about 200° C. for an amount of time sufficient to allow reaction of the metal cation with the acid groups of the polymer. The combination is preferably mixed at a temperature at which both copolymers are liquid, i.e. above their glass transition or melting points.

In various embodiments, at least a portion of the ethylenically unsaturated groups of the unsaturated fatty acid reacts during the melt mixing, for example with water resulting from condensation of a metal hydroxide source of the metal cation with the acid groups.

A golf ball is made from the thermoplastic golf ball material. In various embodiments, the thermoplastic golf ball material is included in a core, in a layer between a core of the golf ball and a cover of the golf ball such as an outer core or mantle layer, or in the cover of the golf ball.

DEFINITIONS

"Driver" refers to a club having a loft of less than about 40°, and "short iron" refers to a club having a loft greater than about 40°. Thus, all woods are considered to be "drivers," as are most of the irons.

A ball is "conforming" if it conforms to the rules of one or more of the organizations that govern professional tournament play, such as the United States Golf Association (USGA), the R&A, and the Japan Golf Association; otherwise, the ball is "nonconforming."

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. In this description of the invention, for convenience, "polymer" and "resin" are used interchangeably to encompass resin, oligomer, and polymer. "Binder" refers to the film-forming components of the coating composition. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

Further areas of applicability will become apparent from the description that follows. It should be understood that the description and specific examples are intended for purposes of illustration only and are not intended to limit the scope of what is claimed.

BRIEF DESCRIPTION OF THE DRAWINGS

The drawings illustrate some aspects of the disclosed technology.

DETAILED DESCRIPTION

A detailed description of exemplary, nonlimiting embodiments follows.

Figure 1:
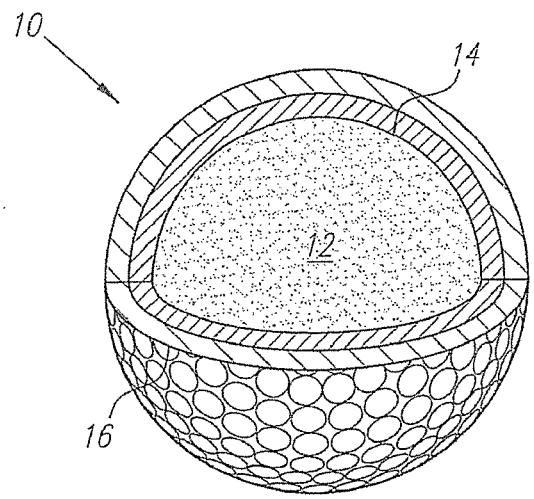
FIG. 1 illustrates a perspective view of a golf ball of the present invention including a cut-away portion showing a core, an outer core or mantle layer, and a cover.
Figure 2:
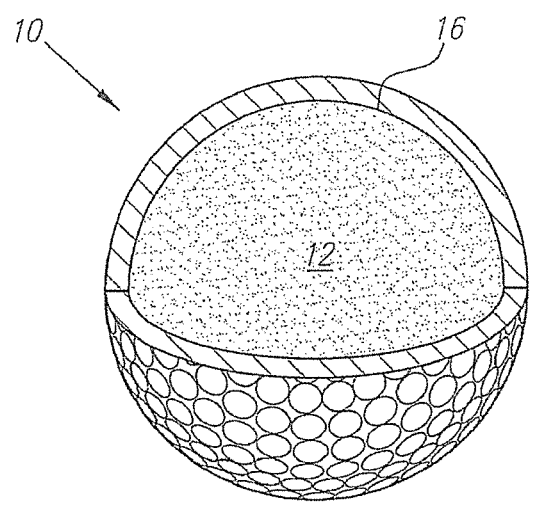
FIG. 2 illustrates a perspective view of a golf ball of the present invention including a cut-away portion showing a core and a cover The parts of the figures are not necessarily to scale.

As shown in FIG. 1, a three-piece solid golf ball 10 includes a core 12, an outer core or mantle layer 14, and a cover 16. As shown in FIG. 2, a two-piece golf ball 10 includes a core 12 and a cover 16. At least one of the core 12, outer core or mantle layer 14, and cover 16 of the golf ball 10 includes the disclosed thermoplastic golf ball material.

The thermoplastic golf ball material is prepared by mixing and reacting a combination including (a) an unneutralized (non-ionomeric) copolymer of ethylene and at least one of acrylic acid and methacrylic acid, which has from about 5 to about 14 percent by weight of the acid monomer; (b) a metallocene-catalyzed copolymer of ethylene and octene; (c) an unsaturated fatty acid; and (d) a metal cation in an amount sufficient to neutralize from about 65 to about 90% of the acid groups in the combination to produce a neutralized ionomer material. The components are preferably mixed at a temperature above the glass transition or melting point temperatures of both copolymers.

The unneutralized (non-ionomeric) copolymer of ethylene and at least one of acrylic acid and methacrylic acid has from about 5 to about 14 percent by weight of the acid monomer. In various preferred embodiments, this copolymer has from about 6 or from about 7 or from about 8 or from about 9 percent by weight up to about 10 or up to about 11 or up to about 12 or up to about 14 percent by weight of the acid comonomer. Particular preferred embodiments that may be mentioned are copolymers of ethylene and acrylic acid that have from about 6 to about 11 percent by weight of the acrylic acid monomer or from about 7 to about 11 percent by weight of the acrylic acid monomer or from about 8 to about 10.5 percent by weight of the acrylic acid monomer and copolymers of ethylene and methacrylic acid that have from about 8 to about 14 percent by weight of the methacrylic acid monomer or from about 9 to about 14 percent by weight of the methacrylic acid monomer. In certain preferred embodiments the copolymer of ethylene and at least one of acrylic acid and methacrylic acid has a melt index of from about 7 to about 25 g/10 min. (2.16 kg @ 190° C.) as measured according to ASTM D 1238.

Examples of suitable non-ionic (unneutralized) ethylene/acrylic acid or ethylene/methacrylic acid copolymers that are commercially available include Primacor 3440, an ethylene/acrylic acid copolymer having 9.7 wt % acrylic acid comonomer, a melt index of 10 g/10 min. (2.16 kg @ 190° C. according to ASTM D 1238), a density of 0.932 g/cm$^3$, a DSC melting peak at 98° C., and a Vicat softening point of 81° C. (ASTM D 1525), and Primacor 3460, both available from Dow Chemical Company, Midland, Mich.; ethylene methacrylic acid materials under the tradename of Nucrel, available from DuPont; and ethylene acrylic acid copolymers sold under the tradename Escor available from ExxonMobil.

The metallocene-catalyzed copolymer of ethylene and octene (b) is prepared using metallocene single-site catalysis. Preferred copolymers contain from about 10 to about 50% by weight of octene monomer units. The copolymers of ethylene and octene included in a thermoplastic material of the invention may be formed by single-site metallocene catalysis such as disclosed in EP 0029358, U.S. Pat. Nos. 4,752,597, 4,808, 561, and 4,937,299, the teachings of which are incorporated herein by reference. Such copolymers can be produced by, for example, a high pressure polymerization process in the presence of a catalyst system comprising a cyclopentadienyl-transition metal compound and an alumoxane. These copolymers may also be produced as disclosed in U.S. Pat. No. 5,272,236, the teachings of which are incorporated herein by reference. In certain preferred embodiments the copolymer of ethylene and octene has a melt index of from about 0.5 to about 30 g/10 min. (2.16 kg @ 190° C.) as measured according to ASTM D 1238.

Nonlimiting examples of suitable commercial copolymers of ethylene and 1-octene include those sold by ExxonMobil under the trade name Exact™ and by the Dow Chemical Company under the trade name Engage™ 8200, Engage™ 8207, Engage™ 8130, and Engage™ 8137. Such copolymers are substantially linear polymers having a density of about 0.86 g/cc to about 0.87 g/cc as measured in accordance with ASTM D-792, a melt index (MI) of about 0.5 to about 30 g/10 minutes (2.16 kg @ 190° C.) as measured according to ASTM D 1238, and preferably have a Shore D hardness of between 70 and 54.

The unneutralized or non-ionic ethylene/acrylic acid or ethylene/methacrylic acid may be from about 10 to about 90 weight percent of the combined weights of the unneutralized or non-ionic ethylene/acrylic acid or ethylene/methacrylic acid (a) and the metallocene-catalyzed copolymer of ethylene and octene. In various preferred embodiments, the unneutralized or non-ionic ethylene/acrylic acid or ethylene/methacrylic acid may be from about 25 to about 75 weight percent of the combined weights of the unneutralized or non-ionic ethylene/acrylic acid or ethylene/methacrylic acid (a) and the metallocene-catalyzed copolymer of ethylene and octene.

The combination used to make the thermoplastic golf ball material further includes at least one unsaturated fatty acid. Nonlimiting examples of suitable unsaturated fatty acids are monoethylenically unsaturated fatty acids such as obtusilic acid (9-decenoic acid), caproleic acid (4-decenoic acid), lauroleic acid (9-dodecenoic acid), 4-dodecenoic acid, myristoleic acid (9-tetradecenoic acid), 4-tetradecenoic acid, 5-tetradecenoic acid, palmitoleic acid (9-hexadecenoic acid), oleic acid (9-octadecenoic acid), petroseleric acid (6-octadecenoic acid), elaidic acid (trans-9-octadecenoic acid), vaccenic acid (trans-11-octadecenoic acid), gadoleic acid (9-eicosenoic acid), ricinoleic acid (12-hydroxyoctadec-9-enoic acid), and erucic acid (13-docosenoic acid); and polyethylenically unsaturated fatty acids such as linoleic acid (9,12-octadecadienoic acid), 9,12-docosadienoic acid, hiragonic acid (6,10,14-hexadecatrienoic acid), linolenic acid (9,12,15-octadecatrienoic acid), elaeostearic acid (9,11,13-octadecatrienoic acid), parinaric acid (9,11,13,15-octadecatetraenoic acid), moroctic acid (4,8,12,15-octadecatetraenoic acid), arachidonic acid (5,8,11,14-eicosatetraenoic acid), and clupanadonic acid (docasapentaenoic acid). Among preferred embodiments are those including myristoleic acid, oleic acid, linoleic acid, linolenic acid, ricinoleic acid, arachidonic acid, and combinations of these. Certain preferred embodiments include at least one polyethylenically unsaturated fatty acid. Other preferred embodiments include at least one monoethylenically unsaturated fatty acid and at least one polyethylenically unsaturated fatty acid. In various embodiments, the fatty acid is a mixture of oleic and linoleic acids, such as a mixture including about 75% by weight oleic acid with other eighteen-carbon fatty acids, in particular a mixture of about 75% by weight oleic acid, about 14% by weight linoleic acid, and about 11% by weight stearic acid.

The unsaturated fatty acid may be used in an amount of 50 to 175 parts by weight, preferably 80 to 150 parts by weight, and more preferably 90 to 140 parts by weight, based on 100 parts by weight of the ethylene (meth)acrylic acid copolymer. "(Meth)acrylic" is used to indicate, methacrylic acid, acrylic acid, or both.

Saturated fatty acids may also be included. Nonlimiting examples of suitable saturated fatty acids include caprylic acid, capric acid, lauric acid, myristic acid, palmitic acid, stearic acid, behenic acid, and ceotic acid. Combinations of these may be used. In general, the saturated fatty acids may be used in the amount of 50 to 175 parts by weight based on 100 parts by weight of the ethylene (meth)acid copolymer.

The unsaturated fatty acids themselves, and not salts of the fatty acids, are used in the method of making the thermoplastic golf ball material.

The combination further includes a metal cation. Nonlimiting examples of suitable sources for the metal cation that may be used include acetates, oxides and hydroxides of lithium, calcium, zinc, sodium, potassium, nickel, magnesium, aluminum, zirconium and manganese. Some specific, nonlimiting examples of suitable metal cation sources are lithium hydroxide monohydrate, lithium hydroxide, lithium oxide, lithium acetate, calcium hydroxide, calcium acetate, calcium oxide, zinc acetate dihydrate, zinc acetate or a blend of zinc oxide and acetic acid, sodium hydroxide, sodium acetate, potassium hydroxide, potassium acetate, nickel acetate, nickel oxide, nickel hydroxide, magnesium oxide, magnesium hydroxide, magnesium acetate, manganese acetate, and manganese oxide. These may be used in any combination.

In various preferred embodiments the metal cation source is selected from zinc acetate dihydrate, zinc acetate or a blend of zinc oxide and acetic acid, magnesium oxide, magnesium hydroxide, magnesium acetate, and combinations of these.

The metal cation is included in an amount sufficient to neutralize from about 65 to about 90% of the acid groups in the combination to produce a neutralized ionomer material. In various preferred embodiments, the metal cation is included in an amount sufficient to neutralize from about 65 or about 75 to about 85 or about 90% of the acid groups of the combination, and preferably is included in an amount sufficient to neutralize from about 75 to about 85% of the acid groups of the copolymers (a) and (b) or, more preferably, of all acid groups in the thermoplastic material.

The ionomeric thermoplastic golf ball materials may be produced according to conventional melt blending procedures. In a preferred embodiment, the copolymers, unsaturated fatty acid, and metal cation source are blended in a Banbury™ type mixer, two-roll mill, or extruder, for example a twin-screw extruder. In the melt, the hydrogens on the acid group of both the ethylene (meth)acrylic acid copolymer and the fatty acid undergo a condensation reaction with the metal cation. The combination of the copolymers, the unsaturated fatty acid, and the metal cation may be mixed at a temperature at which both of the copolymers are molten. In some preferred embodiments, the combination of the copolymers, the unsaturated fatty acid, and the metal cation are mixed together at a temperature from about 150° C. to about 200° C. until the desired percentage neutralization of the acid groups is complete. The blended and reacted ionomeric thermoplastic material is then cooled and formed into slabs, pellets, or other customary shapes or pieces and maintained in such a state until molding is desired.

The materials used in making the ionomeric thermoplastic golf ball material are preferably free of maleic anhydride or maleic acid modification and preferably free of any further material that is a compatibilizer.

The ionomeric thermoplastic material is formed into a golf ball component. The thermoplastic golf ball material prepared as described can be used in making the core or in any layer of the golf ball, including outer core layers or mantle layers or as covers.

A golf ball and its components can be produced by molding processes that include, but are not limited to, those that are well known in the art. For example, golf ball components can be produced by injection molding, reaction injection molding, liquid injection and/or compression molding the ionomeric thermoplastic material as a golf ball core, intermediate layer such as an outer core layer or mantle, or cover layer. The ionomeric thermoplastic material may be used in more than one component or layer of the golf ball.

In one embodiment, granules, pellets, or other pieces of the ionomeric thermoplastic are mixed or dry blended or compounded with one or more customary additives before or during molding. In various embodiments, such a mixture or dry blended ionomeric thermoplastic material is fed into an injection molding machine where homogenization occurs in the mixing section of the barrel prior to injection into a mold. Various additional materials may be added to the ionomeric thermoplastic material of the invention in making the golf balls so long as such materials do not substantially reduce the playability properties of the golf balls. The additional materials used will in general depend upon which ball component—core, cover, or intermediate layer—is made from the thermoplastic material.

Various fillers may be added to compositions used to form the golf ball component layers to reduce manufacturing costs, to increase or decrease weight, to reinforce the thermoplastic material, adjust ball layer density or flex modulus, aid in ball mold release and/or adjust the melt flow index of the ionomeric thermoplastic material and the like. Nonlimiting examples of suitable fillers include clay, talc, asbestos, graphite, glass, mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, aluminum, bismuth, nickel, molybdenum, iron, copper, brass, boron, bronze, cobalt, beryllium and alloys thereof), metal oxides (such as zinc oxide, iron oxide, aluminum oxide, titanium oxide, magnesium oxide, zirconium oxide and the like), particulate synthetic plastic (such as high molecular weight polyethylene, polystyrene, polyethylene ionomeric resins and the like), particulate carbonaceous materials (such as carbon black, natural bitumen and the like), as well as cotton flock, cellulose flock and/or leather fiber. Nonlimiting examples of heavy weight fillers include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, zirconium oxide) and metal stearates (such as zinc stearate, calcium stearate, barium stearate, lithium stearate and magnesium stearate). Other preferred fillers include limestone (ground calcium or magnesium carbonate) and ground flash filler. Fillers that may be used in the layers of a golf ball (generally other than the outer cover layer) are typically in a finely divided form such as, for example, in a particle size generally less than about 20 U.S. standard mesh and, preferably, less than about 100 U.S. standard mesh (except for fibers and flock, which are generally elongated). Flock and fiber sizes should be small enough to facilitate processing. Filler particle size will depend upon the desired effect, cost, ease of addition and dusting considerations. A filler for a golf ball layer preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro-balloons and combinations thereof.

Fillers may be added to any or all layers of a golf ball. Such fillers may be used to adjust the properties of a golf ball layer, reinforce the layer or for any other purpose. In a thermoplastic material blend of the invention, reinforcing fillers may be used without detracting from or significantly reducing the coefficient of restitution (COR) of the material in a golf ball layer. The amount of filler employed is primarily a function of the layer of the golf ball in which the thermoplastic material is used, the desired mechanical properties, and weight restrictions on a golf ball. For example, weight may be distributed between the core and outer layers of the golf ball, including the cover, to control the moment of inertia of the golf ball, thereby potentially altering its performance.

The cover may be formulated with a pigment, such as a yellow or white pigment, and in particular a white pigment such as titanium dioxide or zinc oxide. Generally titanium dioxide is used as a white pigment, for example in amounts of from about 0.5 parts by weight or 1 part by weight to about 8 parts by weight or 10 parts by weight passed on 100 parts by weight of resin or polymer. In various embodiments, a white-colored cover may be tinted with a small amount of blue pigment or brightener.

The cover or other layers may also contain one or more customary additives such as dispersants, hindered amine light stabilizers such as piperidines and oxanalides, ultraviolet light absorbers such as benzotriazoles, triazines, and hindered phenols, antioxidants such as phenols, phosphites, and hydrazides, defoaming agents, processing aids, surfactants, fluorescent materials and fluorescent brighteners, stabilizers, processing aids, and so on.

Other exemplary cover materials include dyes such as blue dye, pigments such as titanium dioxide and zinc oxide, and antistatic agents.

The core is formed, then covered with a cover. The golf balls may be formed using a variety of techniques such as compression molding, thermoforming, injection molding including retractable pin injection molding, reaction injection molding (RIM), and liquid injection molding (LIM), casting, vacuum forming, powder coating, flow coating, spin coating, dipping, spraying, and so on depending on the materials used for a specific component. For example, casting, RIM, or LIM may be preferred when the material is thermoset, whereas compression molding or injection molding may be preferred for liquid compositions or thermoplastic precursors. These methods may be used in preparing the core (unitary or with outer layers), which may then be covered with a dimpled cover layer formed, for example, by injection molding, compression molding, casting, vacuum forming, powder coating, injection molding, and so on.

After a golf ball has been molded, it may undergo various further processing steps such as buffing, painting and marking as disclosed in U.S. Pat. No. 4,911,451.

Together, the core 12 of the golf ball (and any optional core layers) and its cover layer 16 or layers 14 preferably combine to form a ball having a diameter of 1.680 inches or more, the minimum diameter permitted by the rules of the USGA, and weighing no more than 1.62 ounces for a regulation golf ball. Oversize golf balls may also be produced, if desired, using a thermoplastic material.

In another embodiment of the invention, the golf ball may be a one-piece or unitary construction golf ball comprising the blend of the invention. A thermoplastic material as described provides for a very durable golf ball. Such a golf ball may be painted or may have a clear coat or other markings if desired.

In a particularly preferred embodiment of the invention, the golf ball has a dimple pattern that coverage of 65% or more of the surface. The golf ball typically is coated with a durable, abrasion—resistant and relatively non-yellowing finish coat.

The cover is formed on the core (unitary or with outer layers) by injection molding, compression molding, casting, vacuum forming, powder coating, injection molding, and so on. For example, when the cover is formed by injection molding, a core fabricated beforehand may be set inside a mold, and the cover material may be injected into the mold. The cover is typically molded on the core by injection molding or compression molding. Reaction injection molding may be used to provide a thermoset cover. Alternatively, another method that may be used involves pre-molding a pair of half-covers from the cover material by die casting or another molding method, enclosing the core in the half-covers, and compression-molding at, for example, between 120° C. and 170° C. for a period of 1 to 5 minutes to attach the cover halves around the core. In another method, the cover composition may be cast about the core. The cast cover is preferably cured in a closed mold. The casting process may be performed under nitrogen. A first half of the cover may be formed in a mold over the core, then a second half of the cover assembled to the first half and cured to form a finished cover. The core may be surface-treated before the cover is formed over it to increase the adhesion between the core and the cover. Non-limiting examples of suitable surface preparations include mechanically or chemically abrasion, corona discharge, plasma treatment, or application of an adhesion promoter such as a silane. The cover typically has a dimple pattern and profile to provide desirable aerodynamic characteristics to the golf ball.

Typically, the cover may have a thickness of from about 0.5 mm to about 3 mm.

The golf ball may have a coating on the cover. The coating may be a thermoplastic or thermoset polyurethane coating, preferably a thermoset polyurethane coating. In certain preferred embodiments, the coating comprises a polyurethane that is a reaction product of (a) at least one polyisocyanate, (b) at least one polymeric polyol, (c) optionally, at least one further reactant with two or more isocyanate-reactive groups (or "extender"), and (d) optionally, a polysiloxane or fluoropolymer having at least one functional group reactive with isocyanate, hydroxyl, or with another functional group present in one of the reactants forming the polyurethane. The polyisocyanates, polymeric diols, and extenders may be selected from those already mentioned and apportioned to so that the coating containing the polyurethane has the required hardness.

Depending on the composition of the cover, the cover may usefully be prepared to accept the coating layer by application of a primer or adhesion promoter to its surface or by treating its surface with a plasma pretreatment, corona pretreatment, UV irradiation treatment, and electron beam irradiation treatment or flame pretreatment, by sanding, or by otherwise mechanically abrading the surface of the cover. FIG. 2 shows a golf ball in which a clear primer or adhesion promoter layer 108 is applied to the surface of the cover 104 before coating 106.

The coating composition can be applied to the golf ball cover by various methods, such as by spraying, brushing, dipping, rolling, roller coating, flow coating, laminating, or injection backmolding. The particular application method will depend on the coating formulation, as well-known in the coatings art. If the coating composition contains solvent (whether organic or water), the solvent evaporates in forming a coating layer on the golf ball. The applied coating may be heated, for example to temperatures from about 150° F. to about 200° F. (about 65.6° C. to about 93.3° C.) to facilitate solvent evaporation or, in the case of a thermosetting coating, to also cure the binder.

Typically, the coating layer has a thickness of from about 5 μm to about 100 μm. In various embodiments, the coating layer may be from about 5 μm or about 10 μm or about 15 μm to about 100 μm or about 75 μm or about 50 μm or about 25 μm or about 20 μm thick.

Golf balls made with the ionomeric thermoplastic golf ball material can be of any size, although the USGA requires that golf balls used in competition have a diameter of at least 1.68 inches and a weight of no greater than 1.62 ounces. For play outside of USGA competition, the golf balls can have smaller diameters and be heavier.

The following examples illustrate, but do not in any way limit, the scope of the methods and compositions as described and claimed. All parts are parts by weight unless otherwise noted.

EXAMPLES

Examples were prepared with the materials as shown in Table 1.

acid, which are fed at a rate determined according to the formula for the example being made. The combination of these materials passes through a first zone at 100° C.; a second zone at 150° C.; then three consecutive zones at 180° C., during which the materials are melt mixed and reacted together. The product thermoplastic golf ball material is extruded and chopped into pellets.

Preparation of Golf Balls

The thermoplastic golf ball materials of Examples 1-8 were used to prepare example golf balls. The thermoplastic materials that had been prepared were molded into golf ball cores. These cores were then over-molded with a 50-50 by weight blend of Surlyn® 9910/8940 utilizing an injection molding machine and then insert molding process. Mechanically actuated pins held the core in the center of the mold cavity while the hot Surlyn® material blend was injected around. The balls were ejected from the mold, the gate marks were removed, and the balls were cooled.

A comparative ball was made in the same way, but using HPF 2000, obtained from E.I. du Pont de Nemours and Company, Inc as the core material.

Testing of Golf Balls

The compression deformation and coefficient of restitution of each of the golf balls prepared using Examples 1-8 were measured as follows.

A "coefficient of restitution" (COR) is measured as follows. A golf ball is fired by an air cannon at a steel plate or wall positioned about 1.2 meters away from the air cannon at an initial velocity of 40 msec. A speed monitoring device is located over a distance of 0.6 to 0.9 meters from the cannon. After striking the plate, the golf ball rebounds through the speed-monitoring device. The return velocity divided by the initial velocity is the COR.

TABLE 1

| | Example 1 | Example 2 | Example 3 | Example 4 | Example 5 | Example 6 | Example 7 | Example 8 |
|---|---|---|---|---|---|---|---|---|
| Primacor™ 3440[1] | 100 | 100 | 100 | 100 | | | 100 | 100 |
| Primacor 5980i[2] | | | | | 100 | 100 | | |
| Engage™ 8130[3] | 40 | 40 | 40 | | | | 40 | 40 |
| Engage™ 8200[4] | | | | 40 | 40 | 40 | | |
| Mg(OH)$_2$ | 22 | 28.4 | 22 | 22 | 16 | 36 | 28.3 | 22 |
| Oleic Acid/Linoleic Acid/Stearic Acid (75/14/11 by weight) | 100 | 135 | 135 | 100 | 80 | 105 | 100 | 100 |
| Irganox™ 1010[5] | 1 | 1 | 1 | 1 | 1 | 1 | 1 | 1 |

[1]Ethylene/acrylic acid copolymer, 9.7 wt. % acrylic acid, obtained from the Dow Chemical Company.

[2]Ethylene/acrylic acid copolymer, 20.5 wt. % acrylic acid, obtained from the Dow Chemical Company.

[3]Ethylene/octene copolymer, 13% total crystallinity, reported in the literature to be 42 wt. % octene, obtained from the Dow Chemical Company.

[4]Ethylene/octene copolymer, obtained from the Dow Chemical Company.

[5]Sterically hindered phenol antioxidant (Pentaerythritol tetrakis(3-(3,5-di-tert-butyl-4-hydroxyphenyl)propionate)), obtained from BASF Corporation.

Preparation of Thermoplastic Golf Ball Material Examples 1-4

A thermoplastic golf ball material was prepared for each example as follows using a Werner & Pfleiderer 30 mm twin screw extruder, with co-rotating screws rotating at 150 rpm. The two polymers (Primacor™ 3440 and Engage™ 8130 or Primacor 3440 and Engage 8200) are premixed and loaded into the main feed hopper of the extruder. These are fed into the extruder along with the magnesium hydroxide and fatty Compression deformation: The compression deformation is measured as the deformation amount of the ball when the force is increased from 10 kg to 130 kg. Compression deformation is reported as difference between the amounts of deformation of the ball under the force of 130 kg and under the force of 10 kg. For example, a golf ball that deforms 0.5 mm under a 10 kg force and 5.0 mm under a 130 kg force has a compression deformation of 4.5 mm.

Commercial golf balls sold under the tradenames One RZN and One RZN X, obtained from Nike, Inc., were also tested. The results are shown in Table 2.

TABLE 2

| | Example 1 | Example 2 | Example 3 | Example 4 | Example 5 | Example 6 | Example 7 | Example 8 | HPF 2000 | One RZN | One RZN X |
|---|---|---|---|---|---|---|---|---|---|---|---|
| Compression Deformation, mm | 2.64 | 2.75 | 2.64 | 2.57 | 2.22 | 1.77 | 2.21 | 2.24 | 2.25 | 3.75 | 3.19 |
| COR | 0.8230 | 0.8112 | 0.8320 | 0.8187 | 0.8255 | 0.6516 | 0.8355 | 0.8386 | 0.8562 | 0.8022 | 0.8022 |

The results of the testing demonstrate that the experimental thermoplastic that was produced using a less-than-fully-neutralized E/X and metallocene blend has properties very close to those of the commercial HPF 2000 product.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of making a golf ball comprising a thermoplastic golf ball material, comprising:
    combining and reacting (a) an unneutralized copolymer of ethylene and at least one of acrylic acid and methacrylic acid, which has from about 5 to about 10 percent by weight acid monomer; (b) a metallocene-catalyzed copolymer of ethylene and octene; (c)(1) an unsaturated, unsalted fatty acid comprising oleic acid and linoleic acid and (c)(2) a saturated fatty acid; and (d) a metal cation in an amount sufficient to neutralize from about 65 to about 90% of the acid groups, to produce an ionomeric thermoplastic material, wherein the unneutralized copolymer (a) is from about 55 to about 95 weight percent of the combined weights of the unneutralized copolymer (a) and the copolymer of ethylene and octene (b).

2. A method according to claim 1, wherein the combining and reacting are carried out at a temperature of from about 150° C. to about 200° C.

3. A method according to claim 1, in which at least a portion of the ethylenically unsaturated groups of the unsaturated fatty acid reacts.

4. A method according to claim 1, wherein the unneutralized copolymer (a) is a copolymer of ethylene and acrylic acid.

5. A method according to claim 1, wherein the unneutralized copolymer (a) is a copolymer of ethylene and methacrylic acid.

6. A method according to claim 1, wherein the metal cation is provided by a source comprising a member selected from the group consisting of zinc acetate dihydrate, zinc acetate, blends of zinc oxide and acetic acid, magnesium oxide, magnesium hydroxide, magnesium acetate, and combinations thereof.

7. A method according to claim 1, wherein the combining and reacting is carried out in an extruder.

8. A method according to claim 1, wherein the ionomeric thermoplastic material is free of maleic anhydride or maleic acid modification.

9. A golf ball comprising the ionomeric thermoplastic material prepared according to claim 1.

10. A golf ball according to claim 9, wherein a core of the golf ball comprises the ionomeric thermoplastic material.

11. A golf ball according to claim 9, wherein a layer between a core of the golf ball and a cover of the golf ball comprises the ionomeric thermoplastic material.

12. A golf ball according to claim 9, wherein a cover of the golf ball comprises the ionomeric thermoplastic material.

* * * * *